United States Patent [19]
Jernigan, IV et al.

[11] Patent Number: 5,574,907
[45] Date of Patent: Nov. 12, 1996

[54] TWO-PASS DEFRAGMENTATION OF COMPRESSED HARD DISK DATA WITH A SINGLE DATA REWRITE

[75] Inventors: Richard P. Jernigan, IV, Kirkland; Scott D. Quinn, Issaquah, both of Wash.

[73] Assignee: Microsoft Corporation, Redmond, Wash.

[21] Appl. No.: 346,853

[22] Filed: Nov. 30, 1994

[51] Int. Cl.⁶ ................................................. G06F 17/30
[52] U.S. Cl. ........................... 395/601; 395/439; 360/48; 364/282.2; 364/962.4; 364/DIG. 1; 364/DIG. 2
[58] Field of Search ...................................... 395/600, 439; 360/48

[56] References Cited

U.S. PATENT DOCUMENTS

| | | | |
|---|---|---|---|
| 4,833,604 | 5/1989 | Cheng et al. | 395/600 |
| 5,347,638 | 9/1993 | O'Brien et al. | 395/888 |
| 5,390,315 | 2/1995 | Blandy et al. | 395/439 |
| 5,398,142 | 3/1995 | Davy | 360/48 |

OTHER PUBLICATIONS

McDonald et al., "Improving File System Performance by Dynamically Restructuring Disk Space", Eight InternationalPhoenix Conference on Computers and Communications, 22–24 Mar. 1989, Scottsdale Arizona, pp. 264–269.

Brett Glass, "DoubleSpace: DOS 6.0", InfoWorld, vol. 15, No. 37, Sep. 13, 1993, pp. 86–87.
Edward Mendelson, "Defragmenters and Multiboot: Organization or Complication", PC Magazine, vol. 12, No. 15, Sep. 14, 1993, pp. 154–156.
Christopher Barr, "Stacker 3.1 for Windows and DOS", PC Magazine, vol. 12, No. 15, Sep. 14, 1993, pp. 124–126.
Christopher Barr, "Microsoft DoubleSpace", PC Magazine, vol. 12, No. 15, Sep. 14, 1993, pp. 117–119.

*Primary Examiner*—Thomas G. Black
*Assistant Examiner*—Paul R. Lintz
*Attorney, Agent, or Firm*—Jones & Askew

[57] ABSTRACT

A method and apparatus for defragmenting compressed file data stored on a disk. The method includes a first pass in which the FAT and MDFAT entries for each file stored on the disk are rearranged into adjacent clusters, but in which no movement of the compressed file data occurs. The method includes a second pass in which the actual compressed file data is rearranged on the disk in accordance with the FAT and MDFAT entries. A reference point is identified within the disk storage space such that no compressed file data will be stored beyond the reference point after the second pass is completed. During the rearrangement of data during the second pass, compressed file data is temporarily relocated beyond the reference point if possible. During all movements of compressed file data, the method transfers as much data as can be stored within the space to which the data is to be moved.

43 Claims, 8 Drawing Sheets

| Cluster 1 | Cluster 2 | Cluster 3 | Cluster 4 | Cluster 5 |
|---|---|---|---|---|
| File A Part 1 | File B Part 2 | File A Part 2 | File B Part 1 | File B Part 3 |

FIG. 1a  Uncompressed; Fragmented

| A1 | Empty | B2 | Empty | A2 | Empty | B1 | Empty | B3 | Empty |
|---|---|---|---|---|---|---|---|---|---|

FIG. 1b  Compressed; Fragmented

| A1 | A2 | B1 | B2 | B3 | Empty | Empty | Empty |
|---|---|---|---|---|---|---|---|

FIG. 1c  Compressed; Defragmented

| 200 |  |
|---|---|
| FAT | |
| Cluster | Entry |
| 1 | 3 |
| 2 | 5 |
| 3 | EOF |
| 4 | 2 |
| 5 | EOF |

| 204 | |
|---|---|
| MDFAT | |
| Cluster | Entry |
| 1 | 1-4 |
| 2 | 9-13 |
| 3 | 17-19 |
| 4 | 25-31 |
| 5 | 33-39 |

| 206 | |
|---|---|
| DIRECTORY | |
| File | Entry |
| A | 1 |
| B | 4 |

FIG. 5a

Before First Pass

| 208 | |
|---|---|
| FAT | |
| Cluster | Entry |
| 1 | 2 |
| 2 | EOF |
| 3 | 4 |
| 4 | 5 |
| 5 | EOF |

| 210 | |
|---|---|
| MDFAT | |
| Cluster | Entry |
| 1 | 1-4 |
| 2 | 17-19 |
| 3 | 25-31 |
| 4 | 9-13 |
| 5 | 33-39 |

| 212 | |
|---|---|
| DIRECTORY | |
| File | Entry |
| A | 1 |
| B | 3 |

FIG. 5b

After First Pass

After Second Pass

TWO-PASS DEFRAGMENTATION OF COMPRESSED HARD DISK DATA WITH A SINGLE DATA REWRITE

TECHNICAL FIELD

The present invention relates to an improved method and apparatus for defragmenting compressed file data stored on a disk by moving the data of each file into contiguous locations near the beginning of the disk and consolidating all unused space into contiguous locations near the end of the disk.

BACKGROUND OF THE INVENTION

One of the media utilized by computers to store data is a magnetic disk drive. Magnetic disk drives allow computers to alter the data that is stored thereon, such that data can be read from and written onto the magnetic disk. The data is usually stored on the disk in groups called files, with each file being independently accessible. The location on the disk where each file is stored is identified and stored in a data structure so that the computer can quickly access the necessary data when desired.

The storage area on the disk is divided into concentric circles called tracks. The number of tracks on a disk depends on the size of the disk. It is not uncommon for a disk to have over one thousand concentric tracks. Each track on the disk is divided into an equal number of sectors. Typically, the sectors are arranged in slices, such that the sectors at the outer edge, or beginning, of the disk take up more linear space along a track than the sectors near the inner edge, or end, of the disk. However, the data stored within each sector is arranged such that each sector contains an identical amount of data. The location of each sector is stored in a special data structure on the disk, thereby making each sector independently accessible.

The sectors of each track are grouped into clusters. The grouping of sectors into clusters is performed by the operating system and thus is not a physical delimitation. Every track on the disk contains the same number of clusters, and every cluster on the disk contains the same number of sectors. A cluster usually comprises from one to sixty-four sectors, depending on the size of the disk, with each sector storing 512 bytes of data. Because each sector is independently accessible, and clusters are mapped to groups of sectors, each cluster can be independently accessed.

The operating system of a computer stores files in one or more clusters on the disk. A cluster thus contains the contents, or a portion thereof, of a single file. Large files may require several clusters to hold all of the data associated with the file, but extremely small files can be stored in a single cluster. Because a cluster only stores data from a single file, several sectors of the cluster will not be used to store other data if the file does not contain enough data to fill all the sectors of the cluster.

Magnetic disk drives include a stack of several rigid aluminum disks, or platters, coated with magnetic material. Each platter stores data on both its top and bottom surfaces. Data is encoded on the each of the disks by magnetizing areas of the disk surface. Data is retrieved or added to the disk by a read/write head. Each head of the magnetic disk drive consists of a tiny electromagnet attached to a pivoting arm, with the electromagnet being positioned very close to the surface of the disks. One such head is provided for each recording surface on each platter. The arms pivot to move the heads back and forth over the surface of the disks in a generally radial path. Head actuators pivot the arms to control the movement of the heads. When data is written onto a disk, the head is positioned over the appropriate area of the disk where the data is to be written. An electrical current, supplied to the head, produces a magnetic field which magnetizes a small area of the disk near the head. This small magnetized area represents a digital bit. Similarly, when data is read from a disk drive the head is positioned over the appropriate magnetized area of the disk, which induces a current in the head. The current induced in the head is then decoded into digital data.

The rigid platters of the disk drive are connected to a single spindle. The spindle is connected to a motor, which spins the disks in unison at a constant rate. Although the sectors of the disk may take up different amounts of space, the amount of data stored within each sector is identical. This allows the disks to spin at a constant rate to retrieve equal amounts of data regardless of the location of the sector on the disk.

When a new cluster on the disk is accessed, two mechanical operations must occur before the head actually begins to read or write data. First, the head, attached to a pivotable arm, is moved radially from the location of the current cluster to the location of the destination cluster. A certain amount of time is required for the arm holding the head to overcome the effects of inertia and friction so as to effect its movement. Additional time is required to allow the head to settle in a stationary position after its movement. Second, the head must wait for the appropriate cluster of the disk, containing the desired data, to spin beneath the head. Because the disk spins at a constant rate, the maximum amount of time that the head must wait for the desired cluster to pass beneath it is the time required for the platter to complete one spin. Therefore, each access of a new cluster creates an inherent delay due to the mechanical requirements of accessing the correct area of the disk.

The location of files stored on a disk must be maintained to allow the operating system of the computer to access files when desired. Several data structures exist on the disk that are used for file access. Each sector on the disk has a unique identifying number, based on the location of the sector on the disk, so that it can be easily accessed. Similarly, each cluster has a unique cluster number. Identifying numbers are assigned such that adjacent sectors and clusters, respectively, are consecutively numbered. The primary data structure used for determining what parts of the disk are being used for file data storage is the File Allocation Table (FAT). The FAT, stored near the beginning of the disk, contains an entry for each cluster on the disk. Clusters are listed in the FAT consecutively by their cluster number, beginning with the outermost clusters on the disk. The FAT entry for each cluster contains the number of the cluster in which the next part of that file is contained. The FAT entry for the cluster containing the last data of a file comprises an End of File (EOF) entry. Therefore, each file stored on the disk is represented in the FAT as a chain of one or more clusters. Thus. the FAT indicates whether each cluster is allocated to a file, but does not tell the operating system of the computer to which cluster a given file belongs.

Another data structure, called the Root Directory, hereinafter referred to as the Directory, includes a list of all files and subdirectories stored on the disk. The Directory differs from subdirectories in that the Directory is stored near the beginning of the disk prior to sectors used to store file data. Subdirectories are stored in sectors on the disk in the same manner as are files, and the location of each file and subdirectory is maintained in the Directory. The Directory has an entry, for each file, containing the cluster number in which the first part of that file is stored. By storing the starting cluster number of each file, the Directory ties each file to the FAT.

To access a file on the disk, the operating system of the computer reads the Directory entry for the file to determine the first cluster in which file data is stored. The operating system then reads the entire chain of FAT entries starting at the file's first cluster. Using the location of the first cluster and the chain of clusters from the FAT, the operating system can determine every cluster belonging to the file and access each cluster accordingly.

The amount of data that one disk can store is limited by the size of the disk and the number of tracks thereon. However, a technique called data compression allows the data in a file to be stored in less space on the disk. Compression programs, as are well known in the art, typically identify frequently occurring strings of letters, words, or phrases and replace each string with a respective token. Because each token requires a much smaller space for storage than does the respective string, the file data requires less storage space. A file stored using such a technique is called a compressed file. When the compressed data is to be read, it is first accessed and then decompressed to return it to its original form. The compression of files not only saves disk storage space, but also decreases access time because it is often faster to read and decompress a compressed file than to read an uncompressed file.

Unlike disk space allocation for uncompressed files, which are stored in cluster units, compression programs allocate disk storage space by sector units. Compression programs. therefore, support variable-length clusters for the storage of compressed data because only as many sectors as are necessary to store each cluster in compressed form are allocated for that purpose. Therefore, compression programs allow more than one cluster to be stored in the same sectors that would otherwise comprise a single, uncompressed cluster. Variable-length clusters, used to store compressed data, allow previously vacant sectors in a cluster to be allocated to store data from another compressed cluster. This allows each sector of storage space on the disk to be available for storing compressed files.

Disk compression programs increase the amount of data that can be stored on a disk by compressing the data stored in each cluster so that it can be stored in fewer sectors than it would normally require. The technique used by these compression programs is to compress all files on the disk and store them in a single, large file called the Compressed Volume File (CVF). Once the files are compressed and stored in the CVF, any attempt to access one of the files will be intercepted by compression device driver software. This device driver locates the file's compressed data within the CVF and executes the read or write request, decompressing or compressing the file data as necessary.

In order to locate the compressed data within the CVF, the device driver maintains several data structures. The FAT and Directory are maintained, and each contains the same information in the same manner as for an uncompressed drive. Another data structure, called the Sector Heap, occupies the majority of the space in the CVF on the disk. The Sector Heap is an array of sectors on the disk where the compressed data is actually stored.

Another data structure maintained is the Microsoft DoubleSpace File Allocation Table (MDFAT). Microsoft DoubleSpace is a data compression program included in MS-DOS. The MDFAT keeps track of where the uncompressed data for each cluster is stored in compressed form within the CVF. The MDFAT parallels the FAT and contains an entry for each respective entry in the FAT. For each FAT entry for a given cluster, the corresponding MDFAT entry indicates in what sector numbers within the Sector Heap that cluster's compressed data is stored.

A further data structure created for compressed drives is the BitFAT. The BitFAT is a table containing one bit for each sector on the disk. Each bit indicates whether the respective sector is being used to store data or whether the sector is unused, i.e., vacant. Therefore, available, vacant sectors can be found by scanning the BitFAT.

When data on a disk is deleted and new data added. fragmentation may occur. Fragmentation is the storing of pans of a single file in non-adjacent clusters on the disk. The operating system of the computer stores new file data in the first available vacant space. However, the first available vacant space may be too small to store all of the new file data to be stored. Therefore, a portion of the new file data will be stored in the first available vacant space and any leftover data will be stored in the next available vacant space. Unfortunately, the next available vacant space may be located at a distant portion of the disk. Thus, a file may be stored in several non-adjacent clusters at various locations on the disk. Such a file, stored in non-adjacent clusters, is called a fragmented file. FIG. 1 a shows how files can be stored in fragmented clusters.

The storage of fragmented file data in non-adjacent clusters is undesirable and degrades the overall performance of disk drive operations. When the fragmented file is accessed, the heads must make multiple movements to each of the clusters in which the file data is stored. The heads must also wait for the appropriate cluster to spin around to the location of the head before reading or writing of data can begin. Not only do multiple head movements cream an undesirably long access time, they cause excessive wear of the heads, arms, and actuator. Therefore, it is desirable to defragment the disk such that all files are stored in contiguous clusters. Defragmentation speeds access times and lessens the mechanical wear of the head assembly because an entire read or write request can be executed without requiting multiple head movements between non-contiguous clusters, with the spin delay associated therewith.

The objective of defragmentation is to rearrange all files stored on the disk such that each file is stored in contiguous clusters on the disk. A further objective of defragmentation is to store all files in contiguous clusters at the beginning of the disk, thereby consolidating all vacant disk storage space at the end of the disk. Consolidation of vacant space at the end of the disk is beneficial because the operating system need not search as long in order to locate sufficient available space in which to store new data, and the new data is more likely to be stored in contiguous clusters, rather than in numerous smaller groups of clusters scattered throughout the disk.

Compressed file data can become fragmented in the same manner as uncompressed file data. The groups of sectors in the Sector Heap in which the compressed clusters of a file are stored may not be adjacent to one another. Additionally, the unused sectors within the Sector Heap may become scattered around the disk, rather than being consolidated at the end of the Sector Heap. Furthermore, because compression programs allocate disk space for storage of compressed data by sector rather than by cluster, a compressed disk drive is actually more prone to fragmentation than an uncompressed drive. This is demonstrated in FIG. 1 b, where it is seen that compressed data may occupy only a few of the sectors allocated to each uncompressed cluster, thereby leaving several vacant sectors within each cluster. These vacant sectors, freed up by the compression of each cluster, create additional fragmentation because the compressed data of a file, even if stored in contiguous clusters, is not stored in contiguous sectors. Rather, the compressed file data is broken into groups of compressed sectors interspersed with vacant sectors.

The prior method of defragmentation, utilized to rearrange compressed file data in contiguous sectors, requires two stages, or passes. The first pass consolidates the FAT and corresponding MDFAT entries for each file into adjacent cluster entries near the beginning of the disk, thereby consolidating all vacant clusters at the end of the disk. The prior method transfers into adjacent clusters not only the FAT and MDFAT entries for each cluster, but also the actual compressed data stored in each respective cluster. However, this first pass merely ensures that the compressed data is located in adjacent clusters, but does not ensure that the compressed data is located in contiguous sectors.

The second pass utilizes variable-length clusters to store and rearrange the compressed data into adjacent sectors within the Sector Heap. The cluster length of each respective compressed cluster is defined as the number of sectors required to store the data of the uncompressed cluster in compressed form regardless of the number of sectors in an uncompressed cluster. For instance, if all clusters on a given disk have eight sectors, but the data of a particular cluster, stored in compressed form, requires only four sectors, then the compression program sets the length of that cluster at four sectors, rather than eight. FIG. 1c shows how the defragmentation of compressed clusters results in each file being stored contiguously in adjacent sectors.

However, a disadvantage of the prior method involves the unnecessary movements of data. The actual file data stored in the Sector Heap is moved during the first pass, and again during the second pass. During the first pass, where the FAT and MDFAT are rearranged into adjacent entries, the corresponding compressed data for each respective cluster is moved each time the FAT and corresponding MDFAT entries for that cluster are moved. Because each FAT and MDFAT entry may be moved numerous times during the first pass before they are placed in their final position, the corresponding file data must be moved numerous times as well. Such numerous movements of data, requiting multiple movements of the heads to first access the data in its current location, read the data, and then relocate to the new location to write the data, create very long delays and inefficient operation of the defragmentation program. Contributing further to the inefficiency of the current method is that every movement of compressed file data requires a decompress/compress sequence. When compressed data is moved, it is first read, then decompressed, then transferred to the new location, where it is then compressed again before being written into the new location. These operations associated with the transfer of compressed data add to the inefficiency of the current method.

Furthermore, the prior method of defragmentation makes inefficient choices on where to temporarily relocate compressed data during the second pass to make room for the placement of data being moved to its final, defragmented location. Prior methods usually relocate data to the first available vacant space on the disk. Because of this "first fit" relocation, the data placed in a temporary location may subsequently obstruct other data being moved to its final, defragmented location. Therefore, the same data may be moved many times to different temporary locations before it is ultimately placed in its final location. These multiple movements of data result in further inefficiency of the defragmentation program. Because defragmentation programs using the prior method can take several hours to complete, it is desirable to eliminate as much inefficiency as possible from the defragmentation operations.

SUMMARY OF THE INVENTION

The present invention provides a method and system for performing defragmentation of compressed file data stored on a disk. The method performs defragmentation of compressed file data in two passes.

During the first pass, the FAT and MDFAT entries are rearranged such that the entries for each file are located in adjacent clusters. During the rearrangement process, the actual compressed file data stored in each respective cluster is not moved each time the FAT and corresponding MDFAT entries for that cluster are moved. The FAT entries and Directory entries are updated to reflect the new chain of clusters for each file, however, the MDFAT entry is not updated during the first pass because the location of the actual compressed file data on the disk does not change during the first pass.

During the second pass, the size of all compressed, variable-length clusters on the disk are combined and added to the beginning of the Sector Heap to define a reference point Q. When obstructing data, which is a portion of an obstructing file, is stored within the target location of file data being moved to its final defragmented location, a scan is initiated beginning from Q toward the end of the Sector Heap to identify a vacant space in which to temporarily relocate the obstructing data. The obstructing data, plus as many compressed clusters of the obstructing file as will contiguously fit within the temporary vacant space, is then transferred to the temporary location. The location at the end of the data transferred into the temporary location is labeled Q'. Then, the file data being defragmented, plus as many compressed clusters of the file as will contiguously fit within the vacated space at the target location, is transferred to the target location.

When subsequent obstructing data must be moved to a temporary location, the present method first determines whether any vacant space exists beginning at Q'. If enough vacant space exists to store the obstructing data, the obstructing data is stored beginning at Q'. If the obstructing data will not fit within the vacant space beginning at Q', the method initiates another scan forward through the Sector Heap beginning from Q'. If no suitable vacant location is identified during the scan forward, a scan backwards through the Sector Heap toward the front of the disk is executed starting from Q. A predetermined number of vacant locations sufficiently large enough to store the obstructing data are identified and the obstructing data is then stored starting at the beginning of the largest vacant space identified.

Thus, it is an object of the present invention to provide a method and system for defragmenting file data stored on a disk.

It is a further object of the present invention to defragment file data such that each file is stored in adjacent clusters.

It is a further object of the present invention to defragment the files on a disk so as to consolidate all unused disk storage space at the end of the disk.

It is yet another object of the present invention to defragment the files on a disk while relocating the moved data as few times as possible.

It is a still further object of the present invention to defragment files on a disk faster than heretofore has been accomplished.

It is another object of the present invention to defragment files on a disk such that movements of the heads of the disk drive are minimized.

Other objects, features, and advantages of the present invention will become apparent upon reading the following specification, when taken in conjunction with the drawings and the appended claims.

BRIEF DESCRIPTION OF THE DRAWINGS

FIG. 1a is a representation of uncompressed file data stored in fragmented clusters on a disk.

FIG. 1b is a representation of compressed file data stored in fragmented clusters on a disk.

FIG. 1c is a representation of compressed file data stored in defragmented variable-length clusters on a disk.

FIG. 5a is a tabular representation of the FAT. MDFAT, and Directory for compressed, fragmented files prior to initiation of the method of the present invention.

FIG. 5b is a tabular representation of the FAT, MDFAT, and Directory after the first pass of the method of the present invention.

DETAILED DESCRIPTION OF THE PREFERRED EMBODIMENT

Turning next to the figures, the preferred embodiment will now be described in detail. The method of the present invention is useful in connection with a computer system which includes a program to defragment compressed file data stored on a magnetic disk drive.

In general, the disclosed embodiment provides an improved method for defragmenting file data stored on a disk. The inventive method of defragmentation includes two passes. The first pass rearranges the FAT, MDFAT, and Directory entries as required such that all FAT and MDFAT entries are located in adjacent clusters. However, no movement of the actual compressed file data stored within the Sector Heap on the disk is performed during the first pass.

The compressed file data stored on the disk is rearranged during the second pass. Any compressed file data that must be temporarily relocated is moved to a location on the disk beyond a reference point Q. The reference point Q is located at a point on the disk such that after defragmentation is complete, no data will be stored beyond Q. Therefore, all temporarily relocated data, stored beyond Q, need not be moved again prior to its transfer into its final defragmented position because it will not obstruct data being moved to a final, defragmented location in front of Q.

Figure 2:
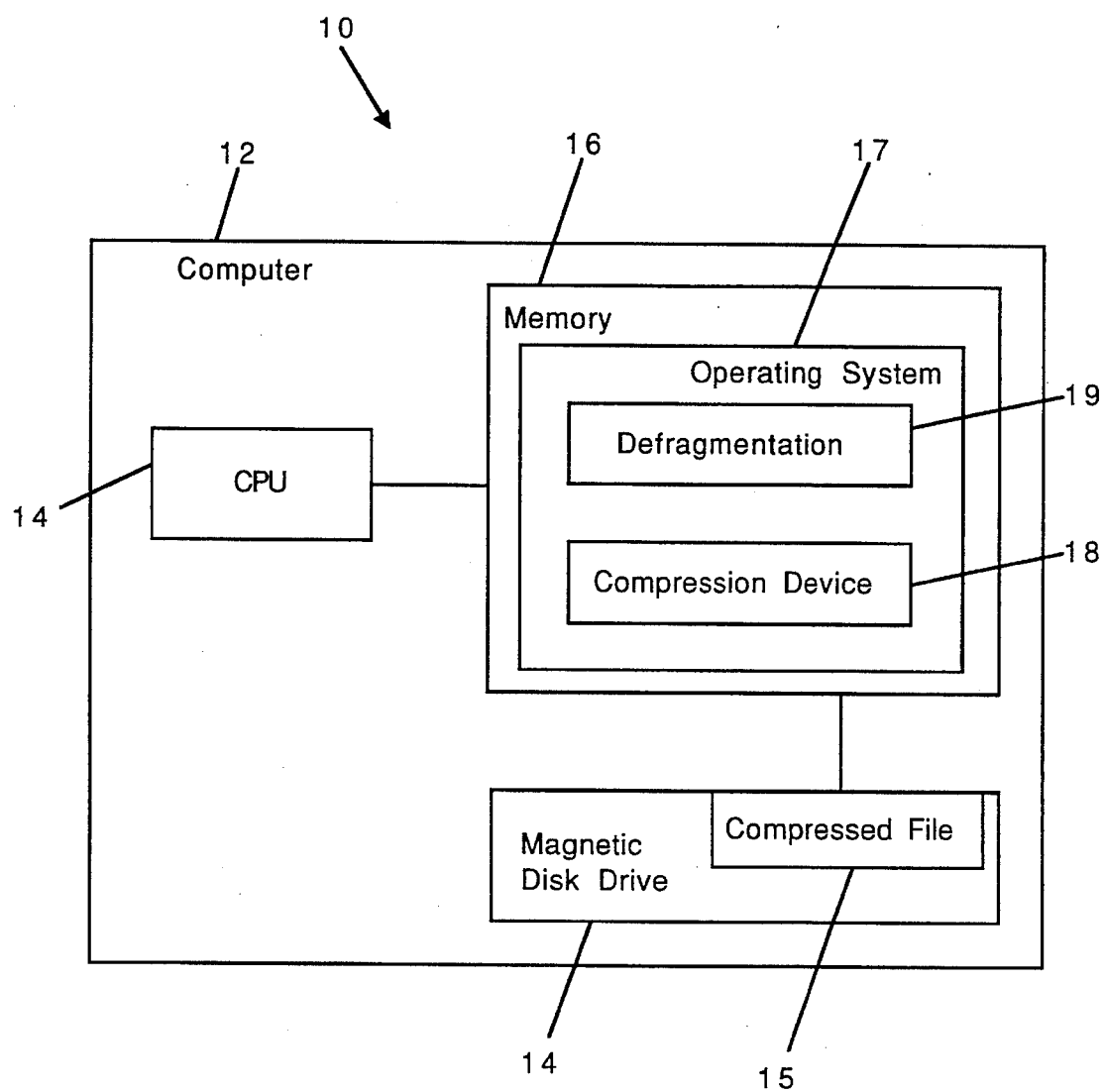
FIG. 2 is a block diagram of a computer system for implementation of the present invention.

As shown in FIG. 2, the method of the present invention is implemented on a computer system, generally shown at 10, comprising a computer 12, having a central processing unit 14, a magnetic disk drive 14 having storage space at least partially occupied by data stored in compressed form 15, and a memory 16 for storing an operating system 17. The operating system stored in memory includes a compression device driver 18 and a defragmentation program 19. The device driver 18 intercepts any attempt by the operating system to access a compressed file stored within the compressed file data 15 on the disk drive 14. The device driver 18 maintains data structures such as the FAT, MDFAT, and Directory to permit access of the desired compressed file data 15 on the disk drive 14. The device driver accesses and reads the data, then decompresses the data and delivers the decompressed data to the operating system for further action. When the operating system requests that data be written in compressed form onto the disk drive, the device driver 18 accesses the location where the data is to be written within the compressed file data 15 on the disk drive 14, compresses the data, and writes the compressed data onto the disk drive.

The present method of defragmentation of the disk drive is implemented by defragmentation program 19 within the operating system 17 of the computer 12. When defragmentation is initiated, the defragmentation program must access the compressed file data 15 on the disk drive 14 in order to rearrange the data in adjacent clusters. Access requests are handled through the device driver 18, which permits the defragmentation program to use the data structures associated with the disk drive, to accomplish the defragmentation operation.

The defragmentation of compressed, file data is accomplished in two stages, or passes. Two passes are required to accomplish the defragmentation of compressed file data because when the data stored in a cluster is compressed, it is stored in only a few sectors of the cluster and thus leaves vacant sectors within the cluster. This is evident from FIG. 1b, where it should be noted that even if all files are stored in adjacent clusters, vacant sectors exist between the end of the compressed file data and the end of the cluster. Therefore, two passes are required, one pass that rearranges the FAT and MDFAT entries into adjacent clusters, and a second pass that actually moves the data into adjacent variable-length clusters such that the data is stored in adjacent sectors with no intervening vacant sectors.

Figure 3A:
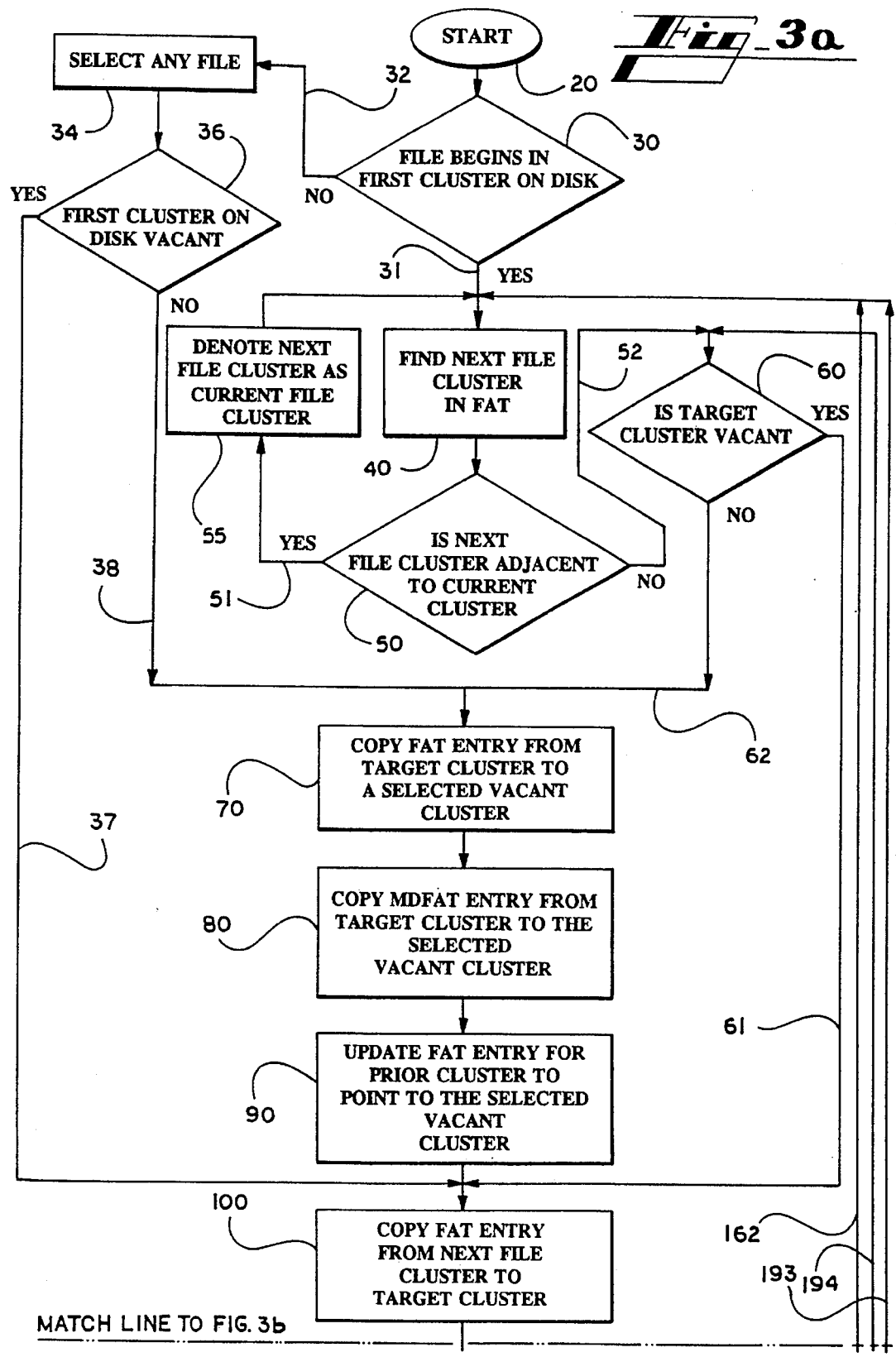
FIG. 3a and FIG. 3b is a flow chart describing the method of the present invention for accomplishing the first pass of the defragmentation program.
Figure 3B:
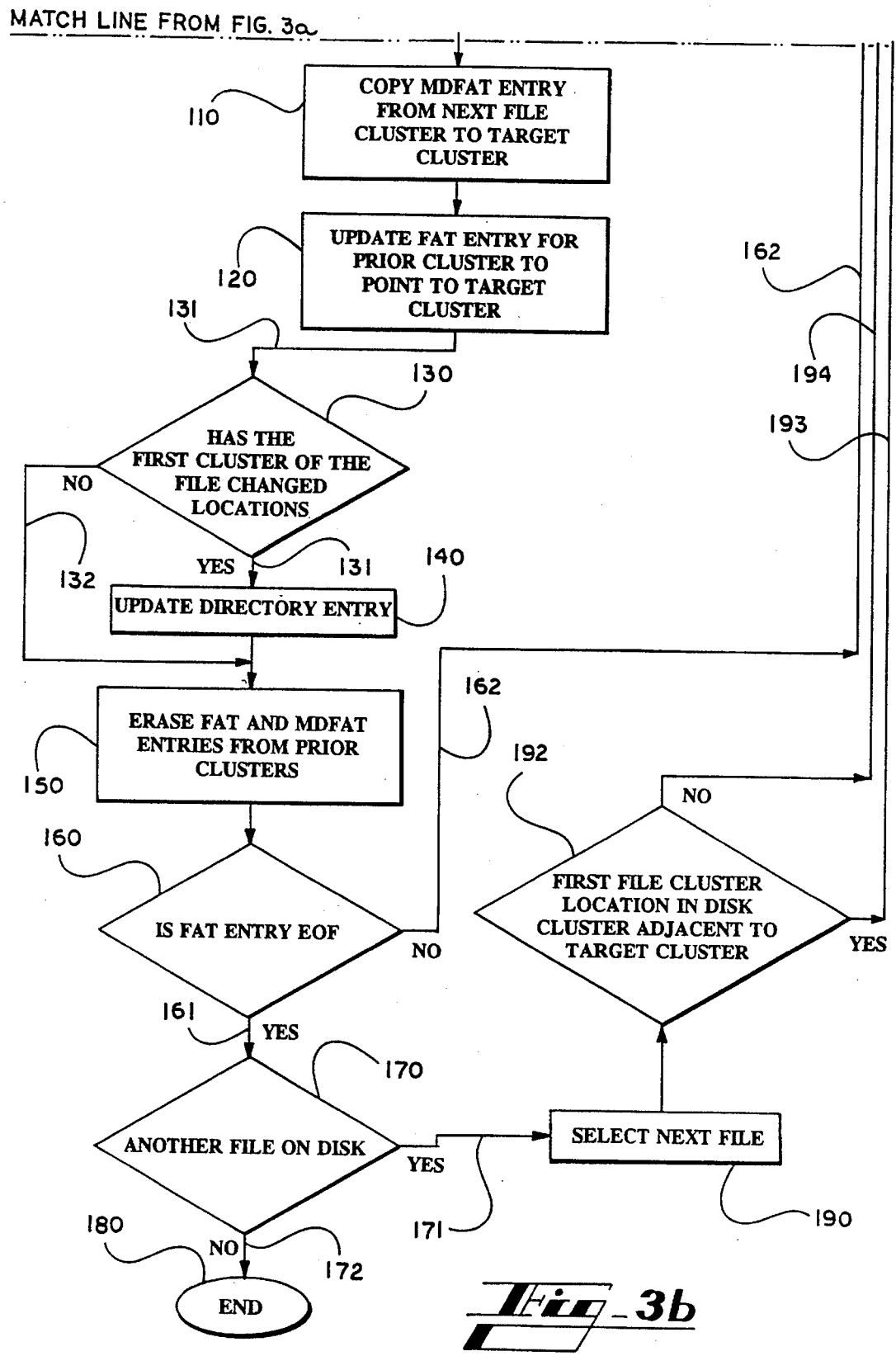

The first pass of the inventive method operates to rearrange all FAT and corresponding MDFAT entries for all files into adjacent clusters at the beginning of the disk. The method used by the first pass, as is well known in the art, is shown in FIG. 3a and FIG. 3b. The first pass begins at step 20. Proceeding to step 30, the method determines whether any file exists having its first cluster of data located in the first cluster of the disk available for file data storage. The determination made by step 30 is accomplished by scanning through the Directory, which includes a list of all files stored on the disk and the number of the cluster in which the first part of each file is located. If the Directory identifies a file which uses the first cluster on the disk to store the file's first cluster, the method follows "yes" branch 31 to step 40.

For purposes of the following description of the inventive method, the term "current file" is used to describe the file for which clusters are at present being moved into their final defragmented position. The term "current file cluster" is the particular cluster of the current file that is being moved into its final defragmented position. The term "next file cluster" refers to the cluster that contains the next portion of data relative to the current file cluster. The next file cluster can be, but is not necessarily, located in an adjacent cluster relative to the current cluster. Similarly, the term "next disk cluster" is the next adjacent cluster on the disk, relative to the current file cluster, that is not used for storage of current file data. The next disk cluster is usually the target of a non-adjacent next file cluster, so the next disk cluster can also be termed the "target cluster".

Step 40 determines the location of the next file cluster. The determination of step 40 is accomplished by looking through the FAT to ascertain the chain of clusters belonging to the current file. The FAT entry for the current file cluster points to the next cluster in which data for the current file is located. After the next file cluster is ascertained, the number of the next file cluster is compared, at step 50, to the current file cluster to determine whether the two clusters under comparison are adjacent. Because all clusters on the disk are consecutively numbered starting from the beginning of the disk, adjacent clusters have consecutive numbers. If the next file cluster number and the current file cluster number are consecutive, then the clusters are adjacent and the method proceeds via "yes" branch 51 to step 55 where the next file cluster is denoted as the current file cluster and the method then returns to step 40 for further comparisons with subsequent file clusters. This process proceeds until it is determined that the next cluster is located in a non-adjacent cluster relative to the current file cluster. When such a determination is made, the method proceeds via "no" branch 52 to step 60.

Step 60 determines whether a FAT entry exists for the target cluster, i.e., the cluster of the disk located adjacent to the current file cluster. If there is a FAT entry for the target cluster, then the entry must be moved to some other vacant cluster to make room for the FAT entry of the next file cluster of the current file. In this case, the FAT entry of the next disk cluster is called the obstructing FAT entry, the file to which the obstructing FAT entry belongs is called the obstructing file, and the next disk cluster in which the obstructing FAT entry lies is the target cluster. If a FAT entry exists for the target cluster, i.e., the target cluster is not vacant, the method follows "no" branch 62 to step 70, where the obstructing FAT entry in the target cluster is copied to a vacant cluster in the FAT. If the target cluster does not contain a FAT entry, then the target cluster is deemed vacant and the method proceeds via "yes" branch 61 to step 100, to be discussed later.

After the obstructing FAT entry is copied to a vacant cluster, the method, at step 80, copies the corresponding obstructing MDFAT entry for the target cluster to the same disk cluster to which the obstructing FAT entry was moved. These steps are necessary so that the FAT and MDFAT entries for the obstructing file are properly updated such that a proper chain of clusters for the obstructing file is maintained. At step 90, the method updates the FAT entry for the most previous cluster of the obstructing file to reflect that the obstructing FAT entry has been relocated to another disk cluster.

The method then, at step 100, copies the FAT entry for the next file cluster of the current file into the target cluster vacated by the obstructing FAT entry. The method then copies the corresponding MDFAT entry for the next file cluster to the target cluster, at step 110. Next, at step 120, the method updates the FAT entry for the most previous cluster of the current file to properly reflect that the next file cluster of the current file has been moved to a new location.

It is determined, at step 130, whether the number of the cluster containing the first file data of the current file has changed. If so, the method follows "yes" branch 131 to step 140, where the Directory entry for the current file is updated to identify the new beginning cluster number of the file. The method then proceeds to step 150. If the beginning cluster of the current file has not changed, as determined by step 130, the method follows "no" branch 132 to step 150. At step 150, the FAT and MDFAT entries for the next file cluster, located in the non-adjacent cluster, are erased.

Step 160 determines whether the FAT entry of the next file cluster contains an End of File (EOF) marker. If the FAT entry does not contain an EOF marker, as determined by step 160, the method follows "no" branch 162 and returns to step 0 to determine where subsequent file clusters are located. If step 160 determines that the next file cluster is the last cluster for the file, the method follows "yes" branch 161 to step 170, where it is determined whether another file exists on the disk. If no other file exists, then the first pass is complete, and the method follows "no" branch 172, which terminates the first pass at 180. If, however, another file exists, as determined at step 170, the method follows "yes" branch 171 to step 190, where another file is selected as the current file.

After a file is selected as the current file at step 190, the method proceeds to step 192, in which the Directory entry for the current file is examined to determine whether its first cluster is located in the next disk cluster, i.e., the cluster immediately adjacent to the cluster storing the last data of the previous file. If the first cluster of the current file is located in the next disk cluster, the method returns to step 40 via "yes" branch 193. If the first cluster of the newly selected current file is not located in the next disk cluster, the method follows "no" branch 194 to step 60.

Returning to initial step 30, if step 30 determines that no file on the disk has its first cluster located in the first cluster of the disk, the method follows "no" branch 32 to step 34, where a file is selected as the current file. Step 36 then determines whether the first cluster on the disk is vacant. If the first disk cluster is vacant, the method follows "yes" branch 37 to step 100 for immediate copying of FAT entry into the vacant first cluster. If not, the method follows "no" branch 38 to step 70.

It should be understood that the rearrangement of the FAT, MDFAT, and Directory entries during the first pass, as shown in FIGS. 5a and 5b, is accomplished without moving the underlying data stored within the clusters. The first pass merely rearranges the FAT, MDFAT, and Directory entries into adjacent clusters at the beginning of the disk. The actual movement of file data stored within the clusters is accomplished only during the second pass. The inventive method utilizes the first pass merely to determine the final, defragmented locations of all file clusters, but does not move the corresponding file data stored within the clusters.

The first pass updates Directory entries for each file when necessary to point to the location of the first cluster of each file. The operating system of the computer maintains the actual location of the data stored within each cluster because the MDFAT entries, although moved to a new cluster along with the corresponding FAT entries, are not changed. The MDFAT entries identify the sectors in which the compressed data of a cluster is located. After the actual data is moved during the second pass, the MDFAT entries are updated to reflect the actual defragmented locations of the compressed cluster data. By not moving the file data during the rearrangement of FAT, MDFAT, and Directory entries in the first pass, great time savings are recognized. The first pass method of the present invention is up to five times faster than the first pass method utilized by prior art implementations.

The effect of the rearrangement of the FAT, MDFAT, and Directory entries during the first pass is shown in FIGS. 5a and 5b. FIG. 5a shows the FAT, MDFAT, and Directory data structures as they would exist for a disk that stores files in compressed form, as shown in FIG. 1b. The FAT 200 shows the fragmented chain of clusters in which data for each file is located. The MDFAT 202 shows the sectors in which compressed file data for each cluster is stored. In this example, each cluster has eight sectors. The Directory 206 shows the files stored on the disk as well as the number of the first cluster used to store data for that file. For example, the data for File A is located in cluster 1 and 3. The data for File B is located in clusters 4, 2, and 5. Therefore, because both files contain data in non-adjacent clusters, both files are fragmented.

FIG. 5b shows the FAT, MDFAT, and Directory after the first pass. The entries for the FAT 208, the MDFAT 210, and the Directory 212 have been rearranged such that each file on the disk now has adjacent FAT entries. According to the FAT after the first pass, File A will be stored in clusters 1 and 2, while File B will be stored in clusters 3, 4, and 5.

However, the rearranged FAT entries seen at 208 does not mean that the actual file data is now located in adjacent clusters 3, 4, and 5. It should be understood that the method of the present invention does not effect the movement of actual compressed file data during the first pass. This is evident from the entries in the MDFAT 210, where it is seen that the actual file data is stored in various, non-adjacent sectors on the disk. For instance, the data for File A is still stored in sectors 1–4 and 17–19. Likewise, the data for File B is still stored in sectors 25–31. 9–13, and 33–39 on the disk. Although the MDFAT entries have been rearranged into adjacent clusters, the actual entries, signifying the sectors in which the compressed file data is stored. remain the same. Therefore, after the first pass, the compressed file data remains stored on the disk as shown in FIG. 1b.

After the first pass is completed such that all FAT and MDFAT entries are located in adjacent clusters, the second pass is initiated. The second pass actually moves the compressed file data into the clusters defined by the FAT and MDFAT entries as arranged during the first pass. It should be understood that the data being moved during the second pass is compressed data that is stored in fewer sectors than is required for the storage of uncompressed data. For purposes of this discussion, the data of an entire uncompressed cluster, stored in compressed form in only a few sectors, is referred to as a compressed cluster.

Figure 4A:
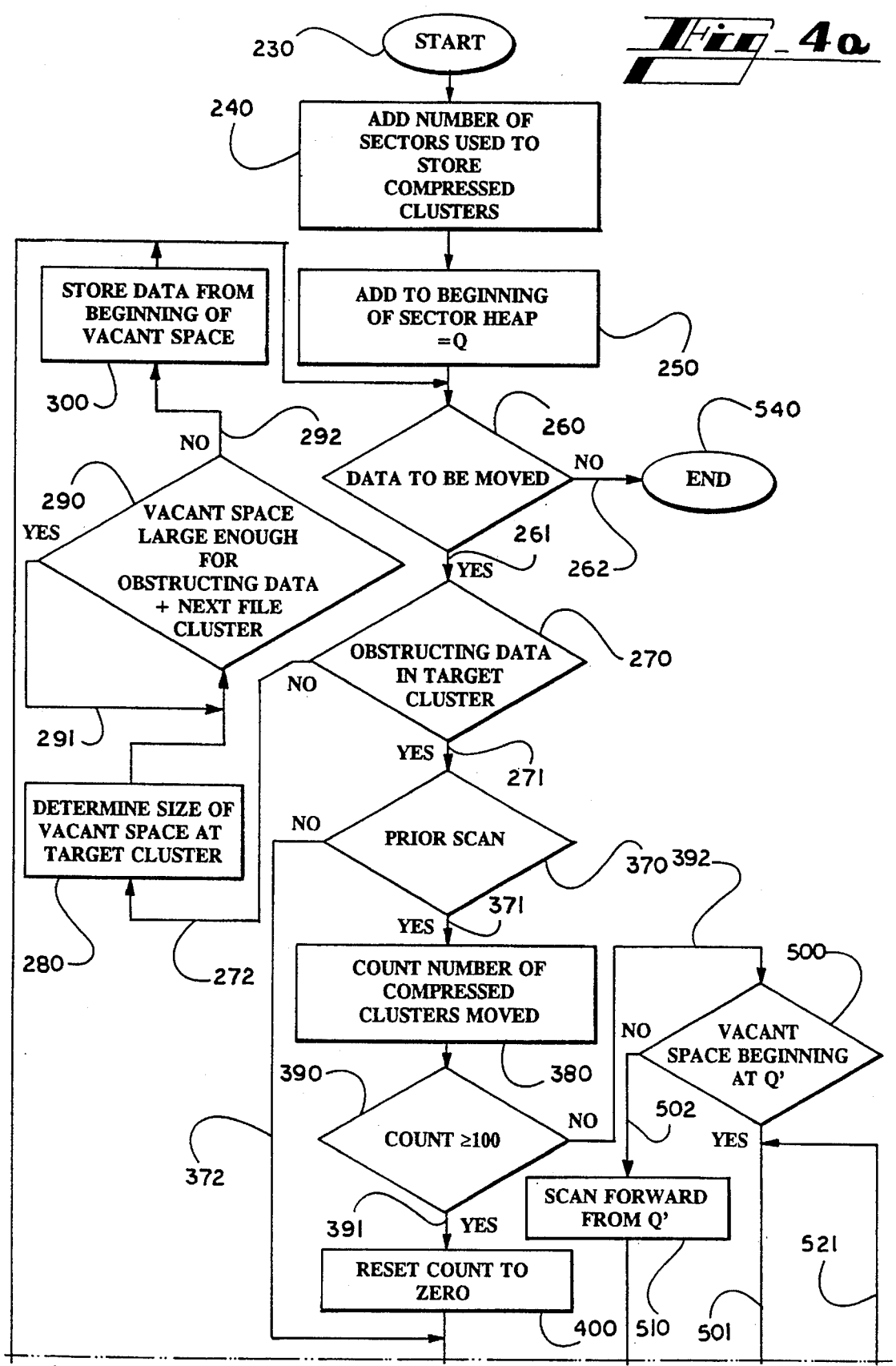
FIG. 4a and FIG. 4b is a flow chart describing the method of the present invention for accomplishing the second pass of the defragmentation program.
Figure 4B:
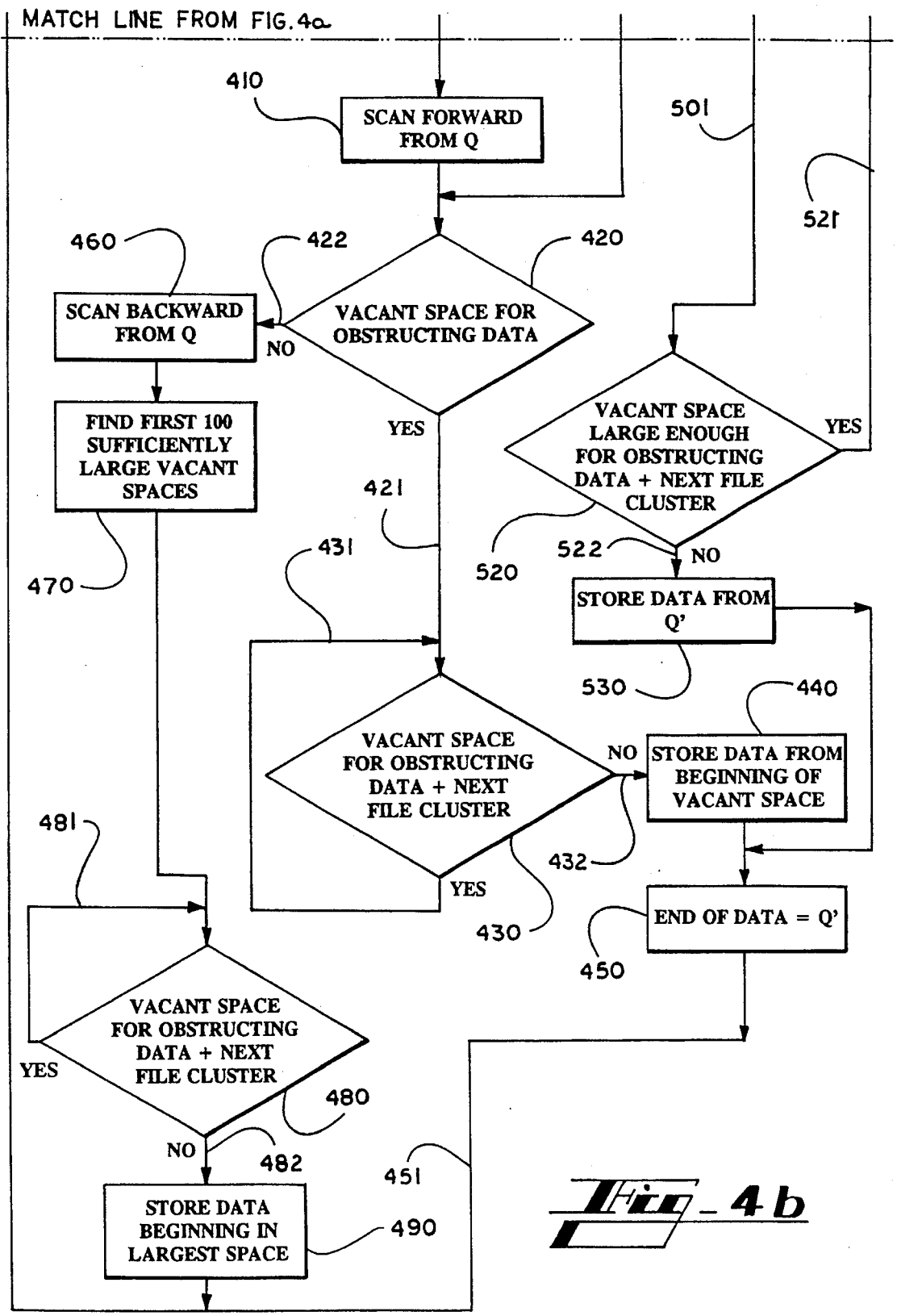

The inventive method for the second pass is shown in FIG. 4a and FIG. 4b, and begins at 230. At step 240, the number of sectors used by all compressed clusters on the disk are added. Each compressed cluster may comprise a different number of sectors, so the size of the compressed clusters will be dependent on the number of sectors used to store the data of each cluster in compressed form. This number of sectors is then added to the beginning of the Sector Heap, at step 250, to determine a reference point Q, at some point within the Sector Heap. The location of Q is unique because any data moved beyond Q will not obstruct any compressed cluster that is being moved into its final. defragmented location near the front of the disk. It is to be noted that during defragmentation, the inventive method moves all data to the front of the disk in contiguous sectors, therefore, after defragmentation, no data will be stored beyond Q.

After the reference point Q has been determined at step 250, the method proceeds to step 260 to determine whether a compressed cluster of the current file, i.e., a current file cluster, is to be moved into its final defragmented location near the front of the disk. The final defragmented location into which the current file cluster is to be moved is determined by the arrangement of the FAT and MDFAT entries performed during the first pass. If a current file cluster is to be moved, the method follows the "yes" branch 261 to step 270. If no current file cluster is to be moved, as occurs when the disk has completed defragmentation with all compressed clusters residing in their final, defragmented locations, the method follows "no" branch 262 and terminates at 540.

Step 270 determines whether the target cluster contains obstructing data. If obstructing data is located within the target cluster, the method follows "yes" branch 271 to step 370. If no obstructing data is located within the target cluster, the method follows "no" branch 272 to step 280. Step 280 determines the size of the vacant space beginning at the target cluster. The method then proceeds to step 290, where it is determined whether the vacant space identified by step 280 is large enough to store the current file cluster plus the next file cluster. If so, the method follows "yes" branch 291 and returns to step 290 to determine whether a still further cluster of the current file can moved into the vacant space. When step 290 determines that no further clusters of the current file will fit within the vacant space, the method follows "no" branch 292 to step 300. At step 300, the current file cluster plus any additional clusters of the current file is stored from the beginning of the vacant space. After the current file cluster and any other clusters of with the current file have been relocated, the method proceeds back to step 260 to determine whether additional data is to be moved.

If step 270 determines that the target cluster is filled by obstructing data, the method proceeds to step 370 to determine whether a prior scan has been executed. If no scan has yet been executed, the method follows "no" branch 372 to step 410 to initiate a scan forward, toward the end of the disk starting from the reference point Q. The scan searches for the first vacant space large enough to store the obstructing data. It is known that when the obstructing data is relocated beyond the reference point Q, it need not be moved again until it is relocated to its final. defragmented location because it will not again obstruct any other compressed cluster being relocated to its final position. The scan is performed by reading the BitFAT entries for each sector in the Sector Heap, starting at Q, to determine whether each sector is being used to store a compressed cluster or is vacant and therefore available to accept data for storage.

After the scan, the method proceeds to step 420, which determines whether a vacant space exists beyond the reference point Q that is large enough to store the obstructing data. If such a location exists, the invented method follows "yes" branch 421 to step 430. Step 430 determines whether the vacant space identified beyond the Q point is large enough to store the obstructing data as well as the next cluster of the obstructing file. If the space is large enough to store the actual obstructing data plus the next cluster of the obstructing file, the method then proceeds along "yes" branch 431 to determine whether the next cluster of the obstructing file can be stored within the space. The method continues along the loop formed by step 430 and "yes" branch 431 until it is determined that no further compressed clusters of the obstructing file will fit within the vacant space located beyond Q. When no further compressed clusters of the obstructing file will fit, the method follows "no" branch 432 to step 440.

Step 440 executes the relocation of the compressed clusters of the obstructing file, beginning with the compressed cluster located in the target cluster, that will fit within the vacant space identified beyond Q. After the transfer of the compressed clusters of the obstructing file, the method proceeds to step 450, where the location at the end of the relocated compressed clusters of the obstructing file is denoted as Q'. After step 450, the method proceeds, via branch 451 to step 260 for a further determination of whether other data is to be moved.

If step 420 determines that no vacant location beyond Q is large enough to store the obstructing data, the method follows "no" branch 422 to step 460. Step 460 initiates a scan backwards, toward the front of the disk, starting from Q. The method, at step 470, locates a predetermined number of vacant locations, preferably about one hundred, that are large enough to store the obstructing data, and selects the largest location. Step 480 determines whether the vacant space into which the obstructing data is to be moved is large enough to store the next compressed cluster of the obstructing file. If the space is large enough to store the actual obstructing data plus the next compressed cluster of the obstructing file, the method then proceeds along "yes" branch 481 to again determine whether a further compressed cluster of the obstructing file can be stored within the space. The method continues along the loop formed by step 480 and "yes" branch 481 until no further compressed clusters of the obstructing file will fit within the vacant space. When no further compressed clusters of the obstructing file will fit, the method follows "no" branch 482 to step 490. The obstructing data, plus any additional compressed clusters belonging to the obstructing file, are then moved to the vacant space. After the obstructing data is moved into the vacant space at step 490, the method returns along branch 451 to step 260.

Step 370 determines whether a prior scan forward from Q has been executed. If a prior scan has been executed, the method follows "yes" branch 371 to step 380 where a counter counts the number of compressed clusters that have been moved to temporary locations. The method then proceeds to step which determines whether the number of compressed clusters that have been relocated to temporary locations is at least equal to a predetermined number, preferably about one hundred. If the number of temporarily relocated compressed clusters is at least equal to the predetermined number, as determined at step 390, the method proceeds along "yes" branch 391 to step 400, where the counter is reset to zero. The method then proceeds to step 410, where a forward scan is initiated beginning at Q.

If the number of temporarily relocated compressed clusters does not equal the predetermined number, as determined at step 390, the method follows "no" branch 392 to step 500. Step 500 determines whether the location identified by the previous scan has enough vacant space remaining to store the obstructing data. If it does, then the method follows "yes" branch 501 to step 520 where it is determined whether the vacant space is large enough to store the next compressed cluster of the obstructing file. If the space is large enough to store the obstructing data located in the target cluster plus the next compressed cluster of the obstructing file, the method then proceeds along "yes" branch 521 to again determine whether a further compressed cluster of the obstructing file can be stored within the space. The method continues along the loop formed by step 520 and "yes" branch 521 until it is determined that no further compressed clusters of the obstructing file will fit within the vacant space. When no further compressed clusters of the obstructing file will fit, the method follows "no" branch 522 to step 530. The obstructing data, plus any additional compressed clusters belonging to the obstructing file, is then stored in the vacant space beginning at Q', at step 530. After the obstructing data is moved into the vacant space, the method proceeds to step 450.

If the vacant location identified during the previous scan does not include enough vacant space to store the obstructing data, as determined by step 500, the method follows "no" branch 502 to step 510, where a scan is initiated beginning at Q', rather than beginning at Q. This eliminates the re-scanning of the space from Q to Q', which is filled with data. After the scan is initiated from Q' at step 510, the method then proceeds to step 420, where the inventive method proceeds to identify vacant space, as previously described.

The method makes determinations as to whether a space is vacant and therefore available for storage, the size of available vacant space, and the size of the compressed clusters to be moved by reading the FAT, MDFAT, and BitFAT data structures. The FAT entries tell the operating system in what chain of clusters the data for a given file is located. The MDFAT lists the location and number of sectors used to store the data of a cluster in compressed form. The BitFAT tracks whether each sector is being used to store data or is vacant, and therefore available for accepting data for storage.

Figure 5C:
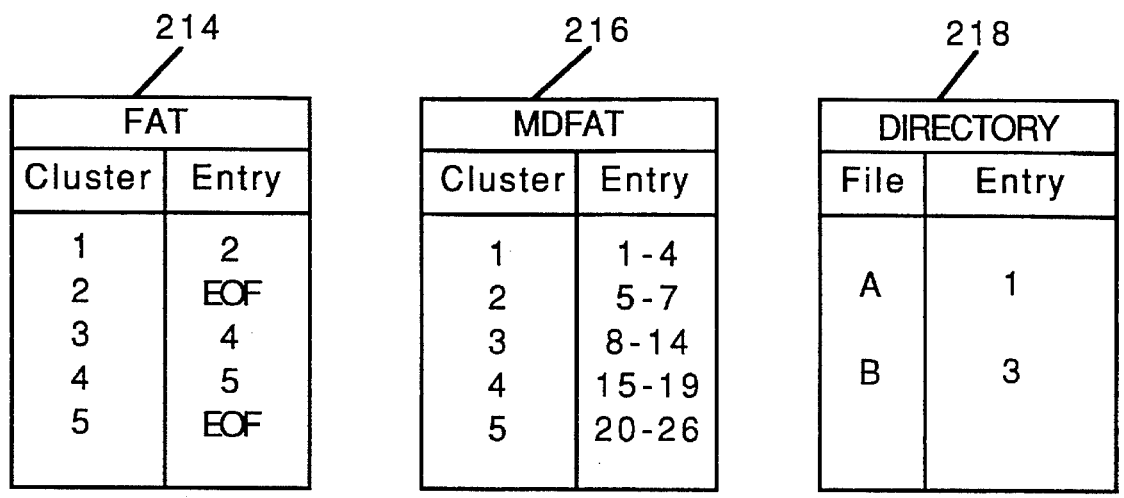
FIG. 5c is a tabular representation of the FAT, MDFAT, and Directory after the second pass of the method of the present invention.

The effect of the rearrangement of the file data in the compressed clusters on the disk into adjacent variable-length clusters, performed during the second pass, is shown in FIG. 5c. During the second pass, the actual compressed data, stored within the sectors in the Sector Heap, is relocated such that the data for each file is located in adjacent sectors at the front of the disk. This rearrangement guarantees that all sectors used for storage of compressed file data are located at the front of the disk and all unused sectors are consolidated at the end of the disk. The results of the second pass can be seen in FIG. 1c, which shows how the data for each file is now located in adjacent variable-length clusters with all unused storage space being consolidated at the end of the disk.

FIG. 5c shows the FAT, MDFAT, and Directory data structures as they would exist for a defragmented disk, as shown in FIG. 1c. The FAT 214 and the Directory 218 are unchanged from the first pass, but the MDFAT 216 has been updated to reflect the new locations of defragmented file data. It should be noted that, after the second pass, the data for File A is located in sectors 1–7 and the data for File B is located in sectors 8–26. The location of file data in adjacent sectors allows much faster access time because the heads of the disk drive need not make multiple relocations to various parts of the disk to access all parts of the file data.

It should be understood from the above discussion that the inventive method of defragmentation includes three distinct improvements over prior implementations to dramatically increase the efficiency of the defragmentation operation. First, the actual data of each cluster is not moved during the first pass as the FAT, MDFAT, and Directory entries for each cluster are rearranged. By eliminating all movement of cluster data during the first pass, the inventive method accomplishes the results of the first pass in approximately one-fifth of the time required by prior methods.

Second, the inventive method optimizes the temporary locations into which obstructing data is moved when vacating the target cluster. The inventive method attempts to move all obstructing data to a location beyond the reference point Q. Any data stored beyond Q will not subsequently obstruct any other data being moved into its final defragmented location because, by definition, no final defragmented locations exist beyond Q. This markedly reduces the amount of movements of data required during the second pass. This drastic reduction of multiple movements of data results in a second pass that is approximately ten times faster than prior methods.

Third, the inventive method, when moving obstructing data into temporary locations, and also when moving data into final, defragmented positions, moves as much data as will fit within the available space, rather than moving only one cluster of data at a time. By determining the size of the space into which data is being moved, the present method is able to move larger blocks of data into the space at one time, thereby eliminating needless repetition of scanning operations. This adds to the increased efficiency of the invented method.

It should be understood that the large blocks of data that are moved during the second pass do not necessarily consist of clusters than are adjacent to one another. The clusters may be located at various locations around the disk, such that the heads must make several movements in order to access each desired cluster to be moved. However, once all desired clusters are read, they can then be written onto the disk at the destination location in only one operation. This form of movement of large blocks of data consisting of multiple clusters is much more efficient than separate and distinct movements of each individual cluster of data. A further benefit of moving large blocks of clusters at one time rather than separately is that after the movement is executed, the clusters are now adjacent. This allows any subsequent movement of the clusters comprising the large data block to be performed very quickly because the head need only make one movement to access all clusters and all clusters of the block can thus be read in one operation. This operation is much faster than if each cluster of the data block were located in non-adjacent clusters.

In summary, the inventive method disclosed above provides an improved method for defragmenting compressed file data stored on a disk. The first pass rearranges the FAT, MDFAT, and Directory entries such that all FAT and MDFAT entries are located in adjacent clusters. However, during the first pass, no movement of the actual compressed file data stored within the Sector Heap on the disk is performed as the corresponding FAT and MDFAT entries for each cluster are rearranged.

During the second pass, the compressed file data stored on the disk is rearranged in accordance with the FAT and MDFAT entries. Any compressed file data that must be temporarily relocated is moved to a location on the disk beyond a reference point Q, located such that after defragmentation of the disk, no data will be stored beyond Q. Therefore, all temporarily relocated data need not be moved again prior to its transfer into its final defragmented position.

It should be noted that the principles of the inventive method, discussed above for compressed disk drives can also be applied to the defragmentation of uncompressed disk drives. With the exception of the steps involving the MDFAT, which, of course, does not exist for uncompressed drives, the steps of both the first and second pass of the invented method can be utilized for uncompressed drives.

From the foregoing, it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and way of constructing other embodiments of the present invention will suggest themselves to practitioners of the art. Therefore, the scope of the present invention is to be limited only by the claims below.

What is claimed is:

1. A method for defragmenting compressed data stored in files in non-adjacent variable-length clusters on a disk having a beginning and an end, each cluster comprising at least one sector, said method comprising the steps of:

maintaining a first data structure having an entry for each file stored on the disk, each entry identifying the cluster in which the first portion of the file data is contained;

maintaining a second data structure having an entry for each cluster on the disk, each entry identifying another cluster in which the next portion of the file data is contained;

maintaining a third data structure having an entry for each cluster on the disk, each entry identifying the sectors in which the file data of each respective cluster is contained;

rearranging the second and third data structures such that the respective entries for each file are located in adjacent clusters starting from the beginning of the disk;

updating the first data structure entries as necessary responsive to said step of rearranging the second and third data structures; and rearranging the file data on the disk such that the file data is located in adjacent clusters as determined by the rearranged second and third data structures;

wherein file data is not moved during said step of rearranging the second and third data structures.

2. The method of claim 1 wherein said step of rearranging the file data is initiated only after said step of rearranging the second and third data structures and said step of updating the first data structure have been completed.

3. The method of claim 1 wherein said step of rearranging the file data comprises the steps of:

determining whether any file data is obstructing current file data to be moved into a location as determined by the second and third data structures;

moving obstructing file data to another location on the disk to create a vacant portion of disk space in which to store the current file data;

moving current file data into the vacant portion of disk space.

4. The method of claim 3 wherein said step of moving the obstructing file data comprises the steps of:

identifying a reference point at a predetermined location on the disk;

scanning forward from the reference point toward the end of the disk until a vacant portion of disk space large enough to store the obstructing file data is identified;

moving the obstructing data into the vacant portion of disk space.

5. The method of claim 4 wherein the reference point is located at a location on the disk such that no file data is stored between the reference point and the end of the disk after said step of rearranging the file data has completed.

6. The method of claim 4 wherein the reference point is determined by adding the size of all variable-length clusters used to store file data on the disk to the beginning of the disk storage space.

7. The method of claim 4 further comprising the step of scanning backward from the reference point toward the beginning of the disk to identify a vacant portion of disk space large enough to store the obstructing file data if said step of scanning forward does not identify a vacant portion of disk space large enough to store the obstructing file data.

8. The method of claim 7 wherein said step of scanning backward is continued until a predetermined number of vacant portions of disk space large enough to store the obstructing file data are identified.

9. The method of claim 8 wherein the obstructing file data is stored in the largest of the identified predetermined number of vacant portions of disk space.

10. The method of claim 8 wherein the predetermined number is approximately 100.

11. The method of claim 4 further comprising the step of determining the size of the vacant portion of disk space, and then determining how many subsequent clusters of file data from the same file as the obstructing file data can be stored within the vacant portion of disk space.

12. The method of claim 11 wherein the clusters of file data from the obstructing file, prior to movement, need not be located in adjacent clusters.

13. The method of claim 12 wherein the clusters of file data from the obstructing file are stored in adjacent clusters in the vacant portion of disk space.

14. The method of claim 3 further comprising the step of determining the size of the vacant portion of disk space, and then determining how may subsequent clusters of file data from the current file can be stored within the vacant portion of disk space.

15. The method of claim 14 wherein the clusters of file data from the current file, prior to movement, need not be located in adjacent clusters.

16. The method of claim 14 wherein the clusters of file data from the current file are stored in adjacent clusters in the vacant portion of disk space.

17. The method of claim 4 further comprising the step of scanning forward from the end of the file data previously stored, rather than from the reference point.

18. The method of claim 4 further comprising the step of scanning forward from the reference point after a predetermined number of clusters of obstructing file data have been moved.

19. The method of claim 18 wherein the predetermined number of clusters is approximately 100.

20. The method of claim 11 wherein said method includes maintaining a fourth data structure having an entry for each sector on the disk, the entry identifying whether each respective sector is being used for data storage or is vacant, and wherein said step of determining the size of the vacant portion of disk space is performed by examining the fourth data structure.

21. The method of claim 14 wherein said method includes maintaining a fourth data structure having an entry for each sector on the disk, the entry identifying whether each respective sector is being used for data storage or is vacant, and wherein said step of determining the size of the vacant portion of disk space is performed by examining the fourth data structure.

22. A method for defragmenting uncompressed file data stored in non-adjacent clusters on a disk having a beginning and an end, said method comprising the steps of:

maintaining a first data structure having an entry for each file stored on the disk, each entry identifying the cluster in which the first portion of the file data is contained;

maintaining a second data structure having an entry for each cluster on the disk, each entry identifying another cluster in which the next portion of the file data is contained;

rearranging the second data structure such that the respective entries for each file are located in adjacent clusters;

updating the first data structure as necessary responsive to said step of rearranging the second data structure;

rearranging the file data on the disk such that the file data is located in adjacent clusters, wherein the clusters in which the rearranged file data are stored is determined by the rearranged second data structure;

wherein said step of rearranging the file data is initiated only after said step of rearranging the second data structure and said step of updating the first data structure have been completed;

wherein said step of rearranging the file data comprises the steps of:

determining whether any file data is obstructing current file data to be moved into a location as determined by the second data structure;

moving obstructing file data to another location on the disk to create a vacant portion of disk space in which to store the current file data;

moving current file data into the vacant portion of disk space;

wherein said step of moving the obstructing file data comprises the steps of:

identifying a reference point at a predetermined location on the disk;

scanning forward from the reference point toward the end of the disk until a vacant portion of disk space large enough to store the obstructing file data is identified;

moving the obstructing data into the vacant portion of disk space;

wherein the reference point is located at a location on the disk such that no file data is stored between the reference point and the end of the disk after said step of rearranging the file data has completed.

23. A system for defragmenting compressed data stored in files in non-contiguous clusters on a disk having a beginning and an end, each cluster comprising at least one sector, said system comprising:

a computer having a memory;

an operating system stored within said memory;

a magnetic disk drive connected to said computer for storing compressed files including compressed file data;

a compression device driver for facilitating communication between said operating system and said compressed file data on said disk drive; and a defragmentation program stored within said operating system;

wherein said disk drive comprises:

first means for maintaining a first data structure having an entry for each file stored on said disk, each said entry identifying the cluster in which the first portion of said file data is contained;

second means for maintaining a second data structure having an entry for each cluster on said disk, each said entry identifying another cluster in which the next portion of said file data is contained;

third means for maintaining a third data structure having an entry for each cluster on the disk, each said entry identifying the sectors in which the file data of each respective cluster is contained;

fourth means for rearranging said second and third data structures such that the respective entries for each said file are located in adjacent clusters starting from the beginning of said disk;

fifth means for updating said first data structure entries as necessary responsive to said rearrangement of said second and third data structures; and sixth means for rearranging said file data on said disk such that said file data is located in adjacent clusters as determined by said rearranged second and third data structures;

wherein said file data is not moved during said rearrangement of said second and third data structures.

24. The system of claim 23 wherein said sixth means operates to rearrange said file data only after said fourth means operates to rearrange said second and third data structures and said fifth means operates to update said first data structure.

25. The system of claim 23 wherein said sixth means comprises:

means for determining whether any said file data is obstructing current file data to be moved into a location as determined by said second and third data structures;

means for moving said obstructing file data to another location on said disk to create a vacant portion of disk space in which to store said current file data;

means for moving said current file data into said vacant portion of said disk space.

26. The system of claim 25 wherein said means for moving said obstructing file data comprises:

means for identifying a reference point at a predetermined location on said disk;

means for scanning forward from said reference point toward the end of said disk until a vacant portion of disk space large enough to store said obstructing file data is identified;

means for moving said obstructing file data into said vacant portion of disk space.

27. The system of claim 26 wherein said reference point is located at a location on said disk such that no file data is stored between said reference point and the end of said disk after the rearrangement of said file data has completed.

28. The system of claim 26 wherein said reference point is determined by adding the size of all clusters used to store said file data on said disk to the beginning of the disk storage space.

29. The system of claim 26 further comprising means for scanning backward from said reference point toward the beginning of said disk to identify a vacant portion of disk space large enough to store said obstructing file data if the operation of scanning forward does not identify a vacant portion of disk space large enough to store said obstructing file data.

30. The system of claim 29 wherein said means for scanning backward operates to continue said backward scan until a predetermined number of vacant portions of disk space large enough to store said obstructing file data are identified.

31. The system of claim 30 wherein said obstructing file data is stored in the largest of said identified predetermined number of vacant portions of disk space.

32. The system of claim 30 wherein said predetermined number is approximately 100.

33. The system of claim 26 further comprising means for determining the size of said vacant portion of disk space, and means for determining how many subsequent clusters of said file data from the same file as said obstructing file data can be stored within said vacant portion of disk space.

34. The system of claim 33 wherein said clusters of file data from the obstructing file, prior to movement, need not be located in adjacent clusters.

35. The system of claim 33 wherein said clusters of file data from the obstructing file are stored in adjacent clusters in said vacant portion of disk space.

36. The system of claim 23 further comprising means for determining the size of said vacant portion of disk space, and means for determining how may subsequent clusters of said file data from the current file can be stored within said vacant portion of disk space.

37. The system of claim 36 wherein said clusters of file data from the current file, prior to movement, need not be located in adjacent clusters.

38. The system of claim 36 wherein said clusters of file data from the current file are stored in adjacent clusters in said vacant portion of disk space.

39. The system of claim 26 further comprising means for scanning forward from the end of the file data previously stored, rather than from said reference point.

40. The system of claim 26 further comprising means for scanning forward from said reference point after a predetermined number of clusters of obstructing file data have been moved.

41. The system of claim 30 wherein said predetermined number of clusters is approximately 100.

42. The system of claim 33 further comprising a seventh means for maintaining a fourth data structure having an entry for each sector on said disk, each said entry identifying whether each respective sector is being used for data storage or is vacant, and wherein said means for determining the size of said vacant portion of disk space operates by examining said fourth data structure.

43. The method of claim 26 further comprising an eighth means for maintaining a fourth data structure having an entry for each sector on said disk, each said entry identifying whether each respective sector is being used for data storage or is vacant, and wherein said means for determining the size of said vacant portion of disk space operates by examining said fourth data structure.

* * * * *